DEPOSITION OF MATERIAL ON TO A MOSAIC SCREEN THROUGH A STENCIL

Filed Dec. 6, 1946

INVENTORS
JAMES D. McGEE
WALTER E. TURK
BY
William A. Zalesak
ATTORNEY

Patented June 10, 1952 2,600,121

UNITED STATES PATENT OFFICE 2,600,121

DEPOSITION OF MATERIAL ONTO A MOSAIC SCREEN THROUGH A STENCIL

James Dwyer McGee, London, and Walter Ernest Turk, Hayes, England, assignors to Electric & Musical Industries Limited, Hayes, England, a company of Great Britain Application December 6, 1946, Serial No. 714,654
In Great Britain October 6, 1945

Section 1, Public Law 690, August 8, 1946
Patent expires October 6, 1965

3 Claims. (Cl. 316—22)

This invention relates to the deposition of material on to a carrier through a stencil. An object of the invention is to provide an improved mode of obtaining intimate contact between the stencil and the carrier.

The invention has particular reference to the production of mosaic screens of the kind comprising a multiplicity of mutually insulated conducting elements, such screens being used for example in cathode ray tubes employed in television cameras. It is known to prepare such screens by depositing the material from which the elements are to be formed on a carrier through a fine wire mesh, but difficulties have been encountered in obtaining good contact between the mesh and the carrier over the whole area over which material is to be deposited, owing to the flexibility and fineness of said mesh, which may be of the order of a few thousandths of an inch in thickness, with the result that material tends to penetrate underneath the wires of the mesh and thus to affect adversely the mutual insulation of the elements.

According to one feature of the invention the desired close contact between the stencil and the carrier is produced by the application of suitable electrostatic force to the stencil so as to urge it towards the carrier.

The invention can be applied with advantage to the manufacture of mosaic screens from materials which cannot conveniently be made by depositing a thin layer of the material which is to form the mosaic elements and then heating the layer to cause it to form globules as in the case of a mosaic screen having silver elements. It is not practicable for example to use this latter method in the manufacture of mosaic screens from antimony or bismuth or components of antimony or bismuth with other metals for example palladium, ruthenium, platinum, iridium and osmium, whereas efficient screens can be made from these materials by depositing them on to a carrier through a stencil and activating them to photo-sensitivity by subjecting them to the action of an activating substance, for example caesium, ribidium or other alkali metal. A still further advantage of the application of the invention to the manufacture of mosaic screens for cathode ray tubes is that it facilitates the formation of a screen in situ within the tube envelope and this is of particular importance in the case of the above-mentioned materials since the efficiency of activated screens made from them is impaired by exposure of the unactivated elements to the atmosphere. In the formation and activation of the elements within a tube envelope gases or vapours adversely affecting the mosaic elements can be excluded by the conventional evacuation of the envelope or by providing the envelope with a filling of inert gas. The invention can also be applied to the manufacture of mosaic screens from other materials, for example silver.

Moreover in the manufacture of photoelectric mosaics in which the deposition of the material to form the mosaic elements is effected within a closed vessel, not only can the stencil be kept in close contact with the carrier without the use of clips or other securing means, but it also enables the stencil to be readily released from the carrier when desired, it being merely necessary for this purpose to cease the application of the electric field.

In the application of the invention to the manufacture of a mosaic screen for a cathode ray tube, using a stencil for the formation of the mosaic elements, it may be desirable that the stencil should be removed from the envelope when it is no longer required. For this purpose the envelope may be provided with a side tube through which the stencil may be withdrawn, a seal then being made at the junction of the side tube with the envelope, the side tube then being removed. The side tube may also serve to enable the stencil to be introduced into the envelope prior to the formation of the mosaic elements and for this purpose the stencil may be rolled up one end of a rod and passed through the side tube, the latter being so arranged that when the rod is rotated in the appropriate direction the stencil unrolls and hangs from the rod in front of the carrier plate. Electrostatic force is then applied to the stencil to urge it into intimate contact with the carrier and when the deposition of the elements is completed, the electrostatic force is removed, and the rod is rotated so as to wind up the stencil and is then withdrawn with the stencil into the side tube. To facilitate rotation of the rod and its withdrawal, the rod may be provided with an armature of magnetic material to which appropriate magnetic forces are applied for rotating the rod or withdrawing it into the side tube.

Figure 1 discloses a sectional view of a tube and structure used in the method of making a mosaic screen according to our invention.

Figures 1, 2, 3:
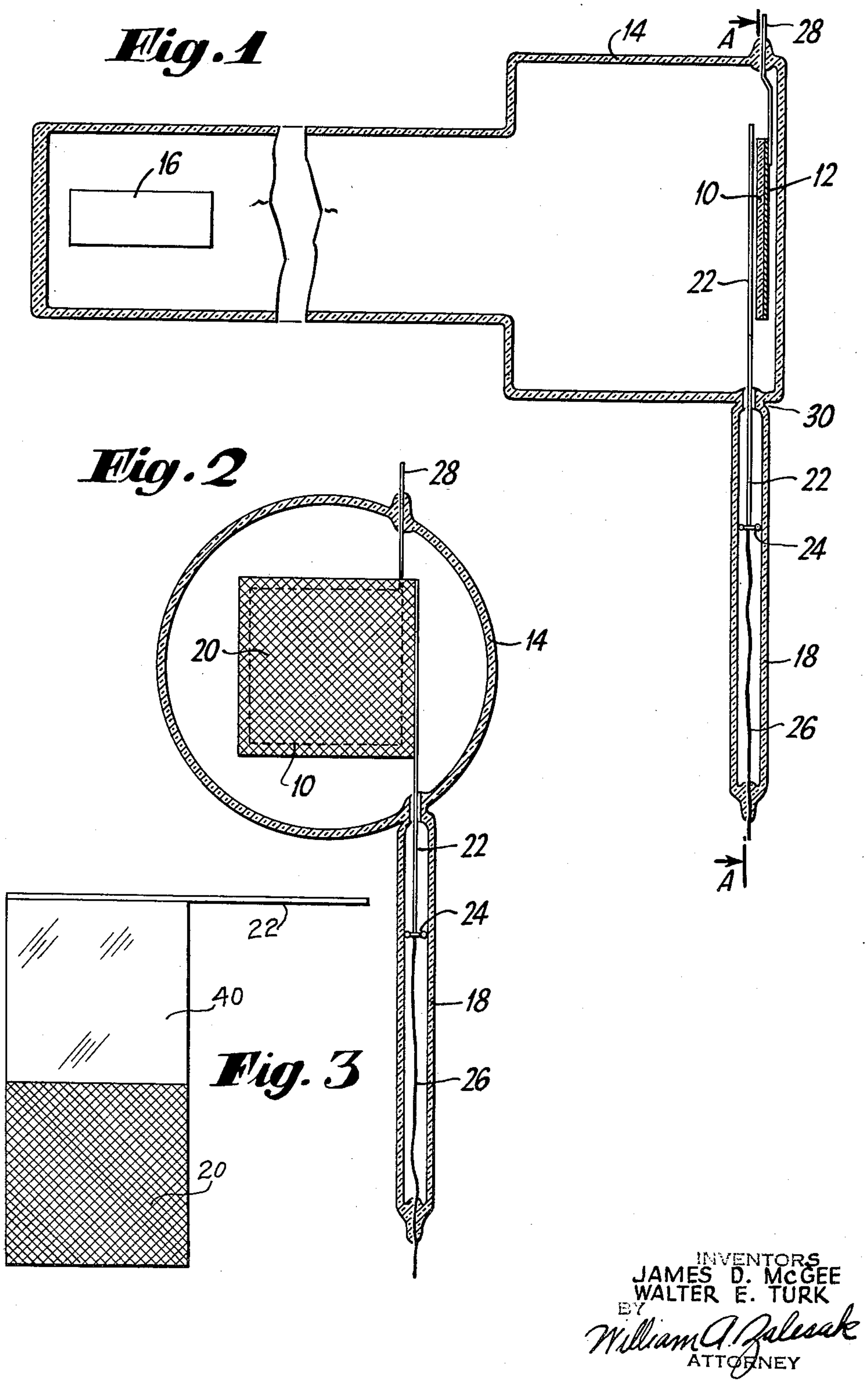
Figure 2 is a sectional view of Figure 1 on line AA.
Figure 3 is a view of a composite stencil and mask according to our invention.

In one method of making a photoelectric mosaic screen in accordance with the invention for a cathode ray tube for use in television transmission, a flat rectangular carrier 10 of glass or mica or other suitable dielectric material is provided on one side with a metal grill or an opaque or a thin transparent layer of metal 12 which serves as the signal plate of the mosaic screen. The carrier 10 is mounted within a cathode ray tube envelope 14 with the metal layer on the side of the carrier 10 remote from the electron gun 16 of the tube. The carrier 10 may be normal to the axis of the electron gun 16 or inclined with respect thereto as in some types of television transmitting tubes. The envelope 14 is provided with a side tube 18 projecting laterally therefrom and so arranged that the axis of the side tube 18 when produced extends across and slightly in front of the carrier. A rectangular flexible stencil 20 in the form of a flat mesh of fine metallic wires for example of silver, nickel, or aluminium is attached at one edge to a metal rod 22. If an aluminium mesh is used it is preferably subjected to an anodising treatment prior to being used. The area of the mesh 20 is slightly greater than that of the desired mosaic. The mesh may have, for example, from 200–400 meshes per inch and should have a suitably small shadow ratio, for example, less than 30 per cent. The rod 22 which is provided at one end with a magnetic armature 24 comprising a pair of pole pieces, one on each side of the rod, is rotated so that the mesh is wound up on the rod. The rod 22 is then passed through the side tube 18 until the rolled-up mesh 20 extends across the carrier plate 10. The side tube 18 is then sealed, and the envelope 14 is connected to a pump and evacuated and degassed by baking it at a temperature of about 400–500° C. The rod 22 is then rotated by suitably manipulating a magnet outside the side tube so as to rotate the armature 24, until the mesh 20 hangs down in front of the carrier 10. The tube 14 is then arranged with its axis vertical so that the mesh hangs away in a curve from the carrier plate. A suitable electric potential is applied between the mesh 10 and the signal plate 12, producing an electrostatic pull between them which pulls the mesh 20 into firm contact with the carrier plate 10. For this purpose a potential difference, for example, of the order of 500–1000 v. is applied between the mesh 20 and signal plate through the intermediary of leads 26 and 28 sealed into the envelope and connected to the rod 22 and the signal plate 12, respectively. It will be appreciated that first the part of the mesh 20 adjacent the rod and then successive areas of the mesh will be drawn into contact with the carrier plate, so that the mesh is spread evenly over and adheres flat to the carrier plate 10. Antimony is then evaporated from a heater element (not shown) within the envelope and becomes deposited on those parts of the carrier 10 which are left exposed by the mesh 20, the envelope 14 being still connected to the pump. There will be little likelihood of the penetration of stibide under the wires of the mesh owing to the close contact between the mesh and the carrier plate. The envelope 14 may be cooled during the evaporation of the metal by liquid air or $CO_2$ snow to further eliminate any scattering of the evaporated metal. The antimony may, if desired, be evaporated from a source of substantial area or from a plurality of sources. When the deposition of antimony is completed, the potential difference is removed so that the flexible mesh 20 can again hang away from the carrier 10. It may be necessary to shake the envelope gently in order to release the mesh from the carrier or apply the same high potential to both mesh and signal plate to mutually repel them. The rod 22 is then rotated, by using a magnet as before, so as to wind up the mesh 20 on the rod, and the armature 24 is drawn along the side tube so that the rod with the mesh thereon is withdrawn into the side tube 18. The side tube is then sealed off at a constriction 30 joining it to the envelope 14 and removed with the rod and mesh. There is left on the carrier a mosaic consisting of a multiplicity of mutually spaced elements of stibide, and said elements are then activated by the deposition of caesium, which may be distilled from a side tube, as described in British Patent No. 513,523, or, as is preferred, released by heating from a capsule carried by a heating filament within the envelope.

The antimony is preferably arranged to be shielded during the above-mentioned degassing operation by withdrawal into a side tube. If the antimony is exposed in the envelope during the degassing operation the baking temperature should not exceed 300° C.

It may happen that during the evacuation and/or baking of the envelope and the components therein and prior to the formation of the mosaic elements the surface of the carrier becomes contaminated with minute quantities of antimony evaporated from the above-mentioned source or sources, or with other undesirable matter. This may subsequently impair the mutual insulation of the mosaic elements. In order to avoid such contamination of the carrier, means may be provided for screening it during the evacuation and/or baking of the envelope. For example, as shown in Figure 3, the mesh 20 referred to above may be attached indirectly to the rod 22 through the intermediary of a mask 40 of metallic foil or other suitable material of about the same dimensions as the mesh. Examples of suitable materials are gold, platinum and aluminium foil. The mask 40 is attached at one edge to the rod 22 so as to hang from it and the mesh 20 is attached to the lower edge of the mask, and the rod is inserted into the envelope with the mask and mesh wound up on it. Prior to the evacuation of the tube the rod 22 is rotated so as to unwind both the mesh 20 and the mask 40 so that the latter hangs down in front of the carrier and electrostatic force is applied to the mask 40 so as to pull it firmly into contact with the carrier plate. The mask is held in contact with the carrier in this manner during the evacuation of the envelope and the main baking operation, so as to protect the surface of the carrier from contamination. When the antimony is to be deposited on the carrier the electrostatic force is removed and the rod 22 is rotated so as to wind up the mask 40 on it and to bring the mesh 20 in front of the carrier 10. Electrostatic force is then applied to the mesh 20 to pull it into contact with the carrier as previously described, and the deposition of antimony and subsequent operations are then carried out in the above described manner.

The envelope 14 is kept connected to the pump following the degassing and is sealed off after activation of the stibide mosaic elements with caesium, so that the whole process of forming and activating the mosaic screen takes place in vacuo. If preferred, the mesh may be removed through an opening in the envelope while the latter is kept full of an inert gas to prevent the ingress of air which may have a deleterious effect on the stibide elements.

In a modification of the above method the mesh instead of being introduced into the envelope as above described may be clipped to the carrier prior to the insertion of the carrier into the envelope, electrostatic force being used as above described to produce close contact between the mesh and the carrier at the appropriate time. When the formation of the mosaic elements is completed the mesh may be withdrawn from the envelope through a side tube or the tube may be turned over so that the mesh hangs down over the signal plate.

What we claim is:

1. The process of making a mosaic screen by depositing conductive material through a stencil onto a carrier, said process comprising the steps of, applying an electrostatic difference of potential between said carrier and said stencil prior to the deposition of said conductive material, depositing said conductive material through said stencil onto the exposed surface of said carrier, applying an equal high electrostatic potential to both said stencil and carrier to mutually repel them to release the stencil from the carrier after deposition of said conductive material.

2. The method of processing an electron discharge device having therein a carrier and a mask mounted adjacent thereto, said method comprising the steps of, applying an electrostatic difference of potential between said mask and said carrier to urge the mask into close contact with said carrier during the processing of said discharge device, processing said discharge device, applying an equal high electrical potential to both the mask and the carrier to mutually repel them to release the mask from the carrier after the processing of the discharge device.

3. The process of making a mosaic screen by depositing material onto a carrier through a stencil, said process comprising the steps of, applying an electrostatic difference of potential between said carrier and said stencil, depositing said material through said stencil onto the exposed surface of said carrier, and separating said stencil and carrier.

JAMES DWYER McGEE.
WALTER ERNEST TURK.

REFERENCES CITED

The following references are of record in the file of this patent:

UNITED STATES PATENTS

| Number | Name | Date |
|---|---|---|
| 2,077,442 | Tedham et al. | Apr. 20, 1937 |
| 2,087,683 | Farnsworth | July 20, 1937 |

OTHER REFERENCES

"Static Electricity," by Hobart Mason, 1904 Ed., McGraw Publ. Co., pgs. 2 and 54.